(12) United States Patent
Woodruff et al.

(10) Patent No.: US 9,267,640 B2
(45) Date of Patent: Feb. 23, 2016

(54) APPARATUS AND METHODS FOR PROVIDING A RETRACTABLE MAST

(71) Applicant: GEO SYSTEMS, INC., Titusville, FL (US)

(72) Inventors: Christopher D. Woodruff, Palmetto, FL (US); George E. Woodruff, Titusville, FL (US)

(73) Assignee: GEO SYSTEMS, INC., Titusville, FL (US)

( * ) Notice: Subject to any disclaimer, the term of this patent is extended or adjusted under 35 U.S.C. 154(b) by 325 days.

(21) Appl. No.: 13/968,188

(22) Filed: Aug. 15, 2013

(65) Prior Publication Data

US 2014/0048672 A1 Feb. 20, 2014

Related U.S. Application Data

(63) Continuation-in-part of application No. 12/883,672, filed on Sep. 16, 2010, now abandoned, which is a continuation-in-part of application No. 11/406,500, filed on Apr. 19, 2006, now abandoned.

(60) Provisional application No. 61/766,297, filed on Feb. 19, 2013, provisional application No. 60/674,345, filed on Apr. 19, 2005, provisional application No. 60/674,346, filed on Apr. 19, 2005, provisional application No. 60/755,054, filed on Dec. 30, 2005.

(51) Int. Cl.
| | |
|---|---|
| *F16M 11/18* | (2006.01) |
| *F16M 11/42* | (2006.01) |
| *F16M 11/40* | (2006.01) |
| *E04H 12/18* | (2006.01) |
| *F16M 11/04* | (2006.01) |

(52) U.S. Cl.
CPC ............ *F16M 11/40* (2013.01); *E04H 12/185* (2013.01); *F16M 11/046* (2013.01); *F16M 11/18* (2013.01); *F16M 11/42* (2013.01); *F16M 2200/065* (2013.01)

(58) Field of Classification Search
CPC ..... F16M 11/046; F16M 11/18; F16M 11/42; F16M 11/40; H01Q 1/087; H01Q 1/1235; E04C 3/005; E04H 12/185
See application file for complete search history.

(56) References Cited

U.S. PATENT DOCUMENTS

| | | | | |
|---|---|---|---|---|
| 980,157 A * | 12/1910 | Jaeger | ...................... | B66F 13/00 254/1 |
| 2,130,993 A * | 9/1938 | Dubiller | ................ | E04H 12/185 160/25 |
| 2,661,082 A * | 12/1953 | Ziegler | .................. | E04H 12/185 182/102 |
| 2,799,368 A * | 7/1957 | Alter | ...................... | E04H 12/185 182/41 |
| 3,016,988 A * | 1/1962 | Browning | ................ | B66F 11/00 187/250 |
| 3,213,573 A * | 10/1965 | Bohr | ........................ | B21C 37/10 174/DIG. 11 |
| 3,319,987 A * | 5/1967 | Bohr | ........................ | E04C 3/005 294/210 |
| 3,457,685 A * | 7/1969 | Stein | ........................ | B66F 11/04 182/41 |
| 3,503,164 A * | 3/1970 | Medal | ..................... | E04C 3/005 52/108 |
| 4,237,662 A * | 12/1980 | Kinzler | .................... | B64G 9/00 52/108 |

(Continued)

*Primary Examiner* — Michael Safavi
(74) *Attorney, Agent, or Firm* — Mannava & Kang, P.C.

(57) ABSTRACT

Apparatus and methods for extending a retractable mast include engaging at least three flexible bands such that each band forms a side of a mast. Each band includes a right edge side and a left edge side, each edge having disposed thereon a set of spaced teeth, each tooth having a slot disposed therein and a tab disposed between adjacent teeth, the tab configured to engage the slot of an opposing tooth.

19 Claims, 10 Drawing Sheets

(56) References Cited

U.S. PATENT DOCUMENTS

| | | | | |
|---|---|---|---|---|
| 4,386,485 A | * | 6/1983 | Kramer | E04H 12/185 52/108 |
| 4,651,480 A | * | 3/1987 | Kramer | E04H 12/185 182/41 |
| 6,112,474 A | * | 9/2000 | Paine | E04H 12/185 242/390.2 |
| 8,042,305 B2 | * | 10/2011 | Pryor | B64G 1/222 244/159.4 |

\* cited by examiner

APPARATUS AND METHODS FOR PROVIDING A RETRACTABLE MAST

RELATED APPLICATIONS

The present application is a continuation-in-part of, and claims priority from: U.S. application Ser. No. 12/883,672, filed Sep. 16, 2010, which, in turn, claims priority from U.S. application Ser. No. 11/406,500, filed Apr. 19, 2010 which, in turn, claims priority from U.S. Provisional Application No. 60/674,345 entitled "Autonomous or Controlled Robot for Undervehicle Inspection" filed Apr. 19, 2005; U.S. Provisional Application No. 60/674,346 entitled "Sensor/Camera Back Pack Lift" filed Apr. 19, 2005; and U.S. Provisional Application No. 60/755,054 entitled "Zipper Mast Lift" filed Dec. 30, 2005, assigned to the assignee hereof. All of the above-listed applications are hereby expressly incorporated by reference herein.

The present application further claims priority from U.S. Provisional Application No. 61/766,297 entitled "Zipper-Mast dual lock system" filed Feb. 19, 2013, and U.S. patent application Ser. No. 13/779,877 entitled "Situational Awareness Mast" filed Feb. 28, 2013.

TECHNICAL FIELD

The disclosed embodiments relate to lift mechanisms, and more particularly, to apparatus and methods for extending a retractable mast.

Lift mechanism technology includes, but is not limited to, hydraulic, pneumatic, and link type structures that may be combined together to form a rigid structure.

BACKGROUND

Extendable masts have seen applications in both the commercial and military markets. For example, electronic packages mounted atop retractable masts include communication and sensor devices, i.e., antennas, cameras and microphones, for collecting sensory data and/or transmitting the collected data to a remote location.

As the deployment of mobile surveillance and communication systems increases, lightweight, portable, mobile, and reliable retractable platform support systems may be desirable.

SUMMARY

A method for extending a retractable mast having at least three flexible bands is disclosed. Each band including a left edge portion, a right edge portion, and a flat body therebetween, each of the right edge portion and the left edge portion of the band has a series of alternating teeth and tabs disposed thereon, each tooth having a slot disposed therein.

The method includes extending the retractable mast by drawing together, by an engagement rotor, flexible bands, wherein the left edge portion of one of the bands engages the right edge portion of an adjacent band of the at least three flexible bands.

A first locking mechanism includes interlocking teeth disposed on the left edge portion of one flexible band with teeth disposed on the right edge portion of an adjacent flexible band. Each tooth includes a crown portion having an upper bent portion and a lower bent portion, and interlocking the teeth includes interlocking the upper bent portion within a notch cut at a lower base portion of an upper opposing tooth, and interlocking the lower bent portion within a notch cut at an upper base portion of a lower opposing tooth, the upper and lower bent portions angled in a same direction so as to extend over the adjacent flexible band.

A second locking mechanism includes a slot, disposed in each tooth, receiving a tab disposed between adjacent teeth on an adjacent band.

The housing further comprises a feed mechanism to draw the at least three band together from respective spools, causing the locking mechanisms to engage and form a rigid mast. When operated in reverse, the feed mechanism retracts the mast, separates the bands, and allows the bands to rewind on their respective spools.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

6B is a perspective drawing of a cable being coiled in a cable pan during retraction of a mast, according to an example of the present disclosure.

DETAILED DESCRIPTION

Figure 1:
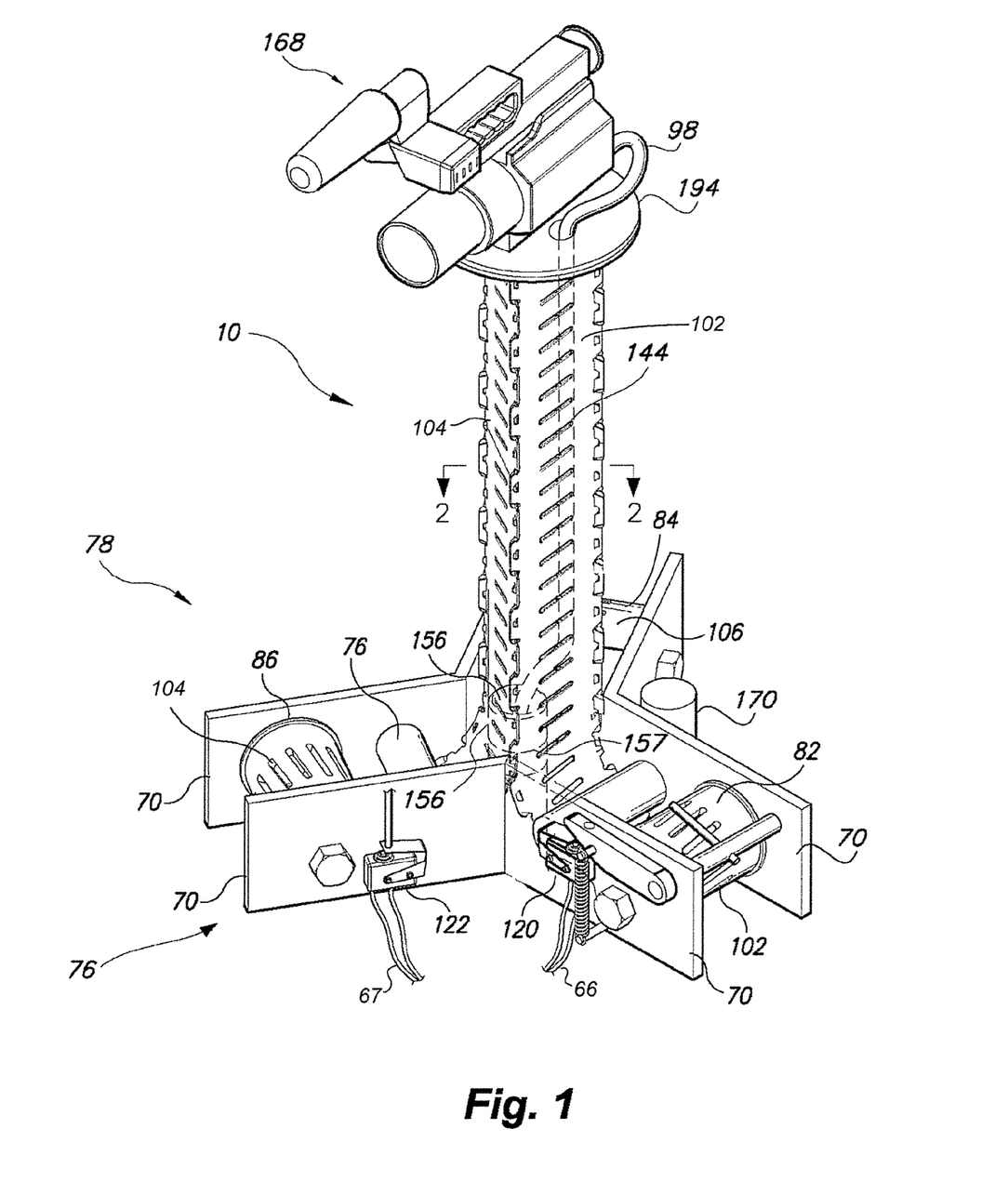
FIG. 1 is a perspective drawing of a lift mechanism extending a retractable mast from a set of flexible bands, according to an example of the present disclosure.

FIG. 1 illustrates one embodiment of an apparatus 10 for extending a retractable mast 100. The retractable mast 100 includes a platform 194 on which a device or devices 168 may be mounted. The retractable mast 100 is formed from at least three flat flexible bands 102, 104, 106, each band having a set of alternating tabs and slotted teeth disposed along opposite edges of the bands. The teeth of one band engage the teeth of an adjacent band in a first interlocking relationship to hold the bands in a rigid formation. Further still, a tab disposed between adjacent teeth of one band engages a slot in each tooth of the interlocked band to form a second interlocking relationship to further secure the bands and form a stable mast that will resist unraveling under adverse conditions.

In one embodiment, the apparatus 10 of FIG. 1 illustrates a camera/sensor and microphone package 168 being elevated by mast 100 rising from a base unit 78 that comprises three pairs of spaced apart upright support members 70. Each pair of upright support members 70 respectively supports a spool 82, 84, 86 of coiled bands 102, 104, and 106 rotatably mounted along a horizontal axis.

Figure 2:
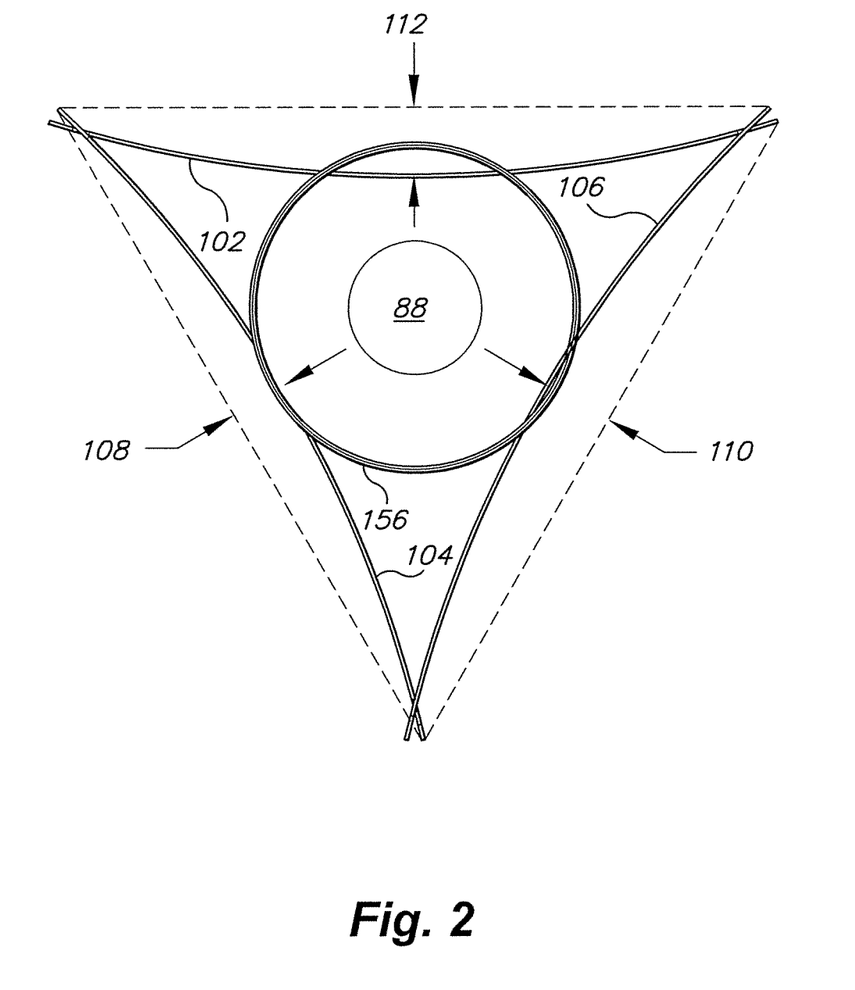
FIG. 2 is a view taken along lines 2-2 of FIG. 1, according to an example of the present disclosure.

FIG. 1 further depicts a feed mechanism that includes engagement rotor 156 that is operable to draw together bands 102, 104, and 106 from spools 82, 84, and 86 into a mast having a substantially triangular cross section (see FIG. 2). The bands may pass beneath rollers 76 that guide the bands towards the engagement rotor 156. Turning of engagement rotor 156 causes the bands to interlock extends mast 100, elevating platform 194 that in at least one embodiment supports camera/sensor package 168.

In some embodiments, engagement rotor 156 is rotatably mounted to the base 78 along an axis of rotation in a direction of the extension and retraction of the mast, and may be positioned at a center of a triangular formation of the three bands 102, 104 and 106 as best depicted in FIG. 2. FIG. 2 further shows a section view of mast 100 illustrating the inward camber 108, 110, 112 of bands 104, 106, 108 respectively, that may result from flexing the bands when the opposing edges of the bands are engaged according to a primary interlocking mechanism and a secondary interlocking mechanism to be discussed in detail below.

Rotated by a motor 170 mounted on the base 78 via a chain drive or other appropriate linkage arrangement, the engagement rotor 156 comprises a helical thread 157 and is operable to extend or lower the mast 100 by engaging at least one row of angled drive slots 144 disposed along a center length of at least one of bands 102, 104, and 106. In the embodiment depicted in FIG. 5, engagement rotor 156 engages three slots 144 of each band to elevate and lower mast 100. As engagement rotor 156 rotates, rotor 156 continually accepts the next slot 144 in an adjacent band. Alternatively, engagement rotor 156 may engage only one or some number of bands less than the number of bands extending the mast 100. For example, in one embodiment, only one band may have angled drive slots 144 and the engagement rotor is configured to engage only the band comprising the angled slots 144.

FIG. 1 further illustrates a high limit switch 120 to provide a signal when the mast is fully extended and. Low limit switch 122 provides a signal when the mast is fully retracted.

Figure 3:
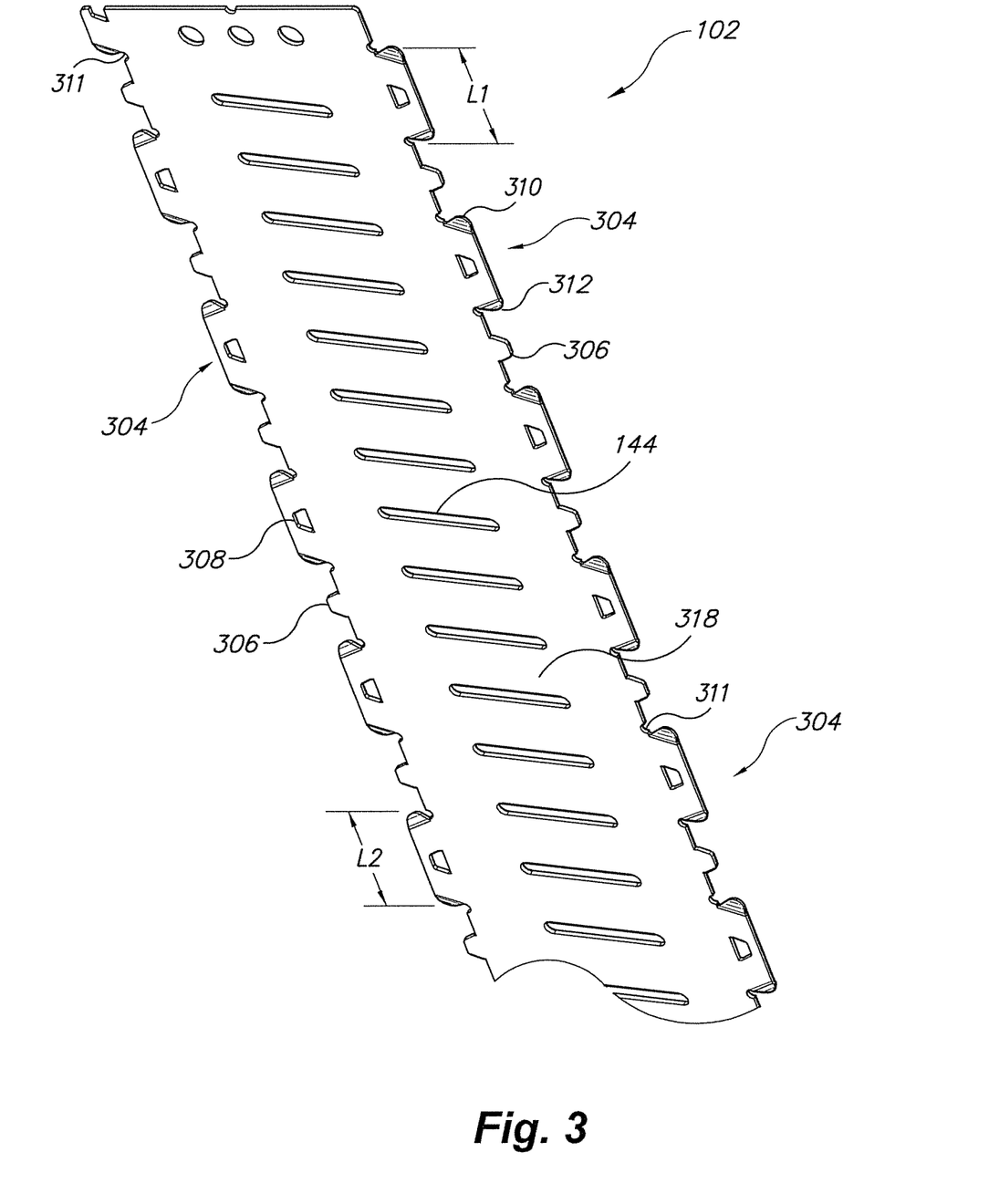
FIG. 3 is perspective view of a portion of the flexible band, according to an example of the present disclosure.
Figure 4:
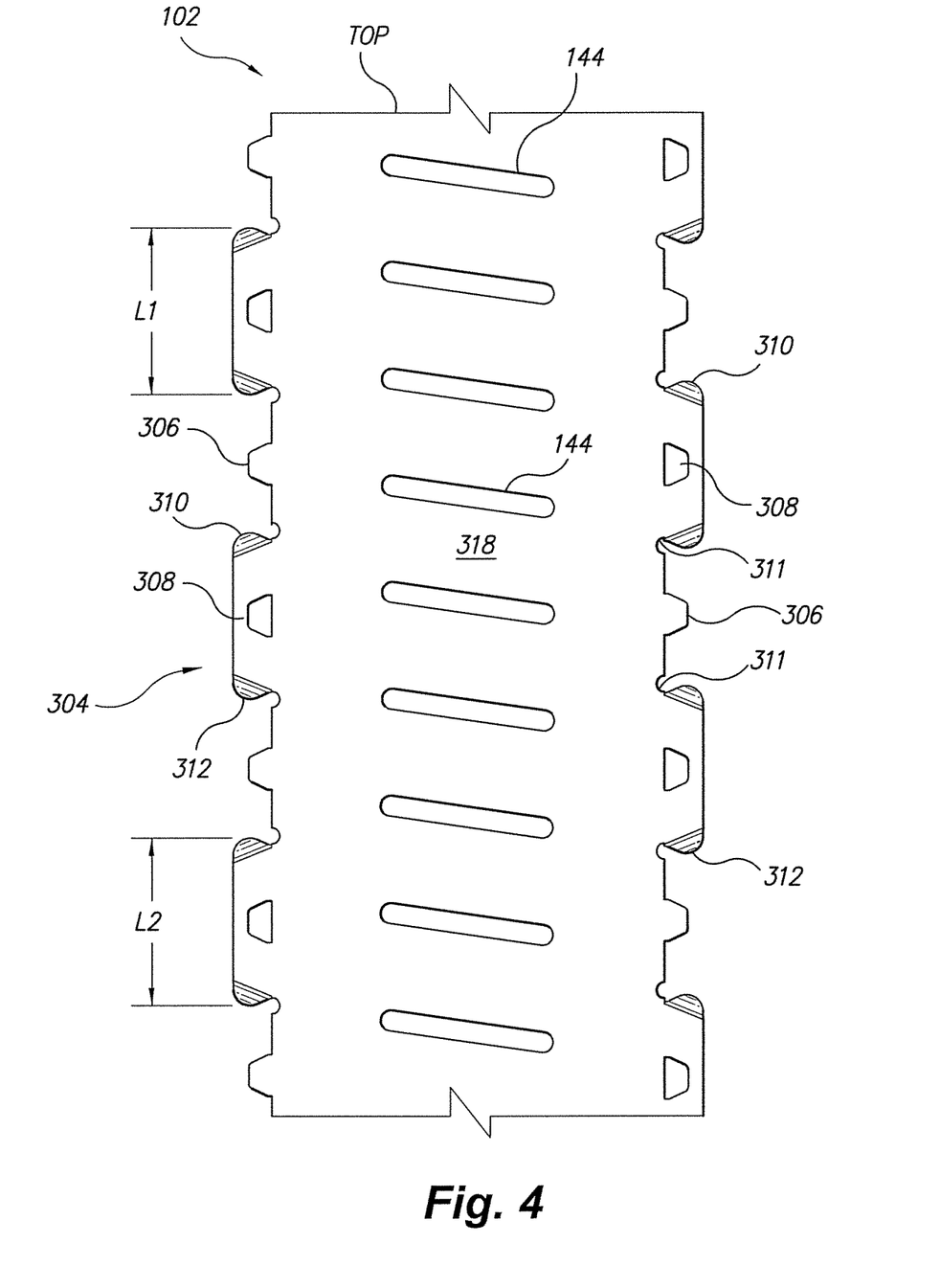
FIG. 4 is a plan view of a portion of the flexible band, according to an example of the present disclosure.

FIGS. 3 and 4 illustrate flexible band 102 of a set of three flexible bands 102, 104, and 106 that when engaged, form mast 100. Each band 102, 104, and 106 includes two rows of spaced apart teeth 304 disposed along opposite edges of a flat middle body portion 318 of each band. Each tooth 304 on both sides of each band includes a crown portion wherein an upper projecting portion 310 (defined as that portion closest to a top of the mast 100), and a lower projecting portion 312, both projecting portions bent approximately 20-25 degrees towards the adjacent band, to facilitate interlocking with the adjacent band. In order to ensure a compact storage of bands 102, 104, and 106 on respective spool assembly 82, 84, and 86 (see FIG. 1), the length of teeth 304 are progressively longer starting from a bottom tooth 304 having a length L2, that corresponds to the bottom of mast 100, towards the top of the mast 300 where a length L1 of an uppermost tooth 304 is longer than length L2. Based upon the progressively longer teeth 304, overlapping layers of a band on a spool lay flat over the underlying layer, the tooth including the projecting portion 301 and 312 of an underlying layer of spooled band resting beneath the longer tooth of the above layer, thus allowing for compact spooling of the band.

Because the bands are drawn together via helical thread 157, at any point in time, the three bands 102, 104, and 106 engage three different sections of the helical thread 157. In order for the teeth 304 of adjacent bands to interlock, the teeth 304 on the three bands are differently placed, relative to the angled slot. Accordingly, the three bands 102, 104, and 106 form a set, each of bands being unique and non-interchangeable with the other two bands to ensure that the three bands properly engage and interlock.

The bands 102, 104, and 106 are designed to provide a dual locking mechanism, comprising a primary locking mechanism and a secondary locking mechanism. The primary locking mechanism is based on each tooth 304 of each band interlocking between two teeth 304 of an adjacent band. Projecting portions 310 and 312 of each tooth 304 engage a notch 311 disposed at a base portion of an upper tooth 304 and a lower tooth 304, respectively, an opposing band. In at least one embodiment, the notch 311 is semi-circular shaped. Once each tooth is locked between two opposing teeth, the notches provide an additional impediment preventing the teeth from separating.

The secondary locking mechanism is provided by the engaging of a tab 306, disposed between each of two adjacent teeth on one band, engaging a slot 308 disposed in the center of each opposing tooth 304 on an adjacent band. The tabs 306 and the slots 308 are shaped such that the edges of tab 306 bind within an inside edge of slot 308. This dual locking mechanism advantageously minimizes twist and provides greater mast stability.

Figure 5:
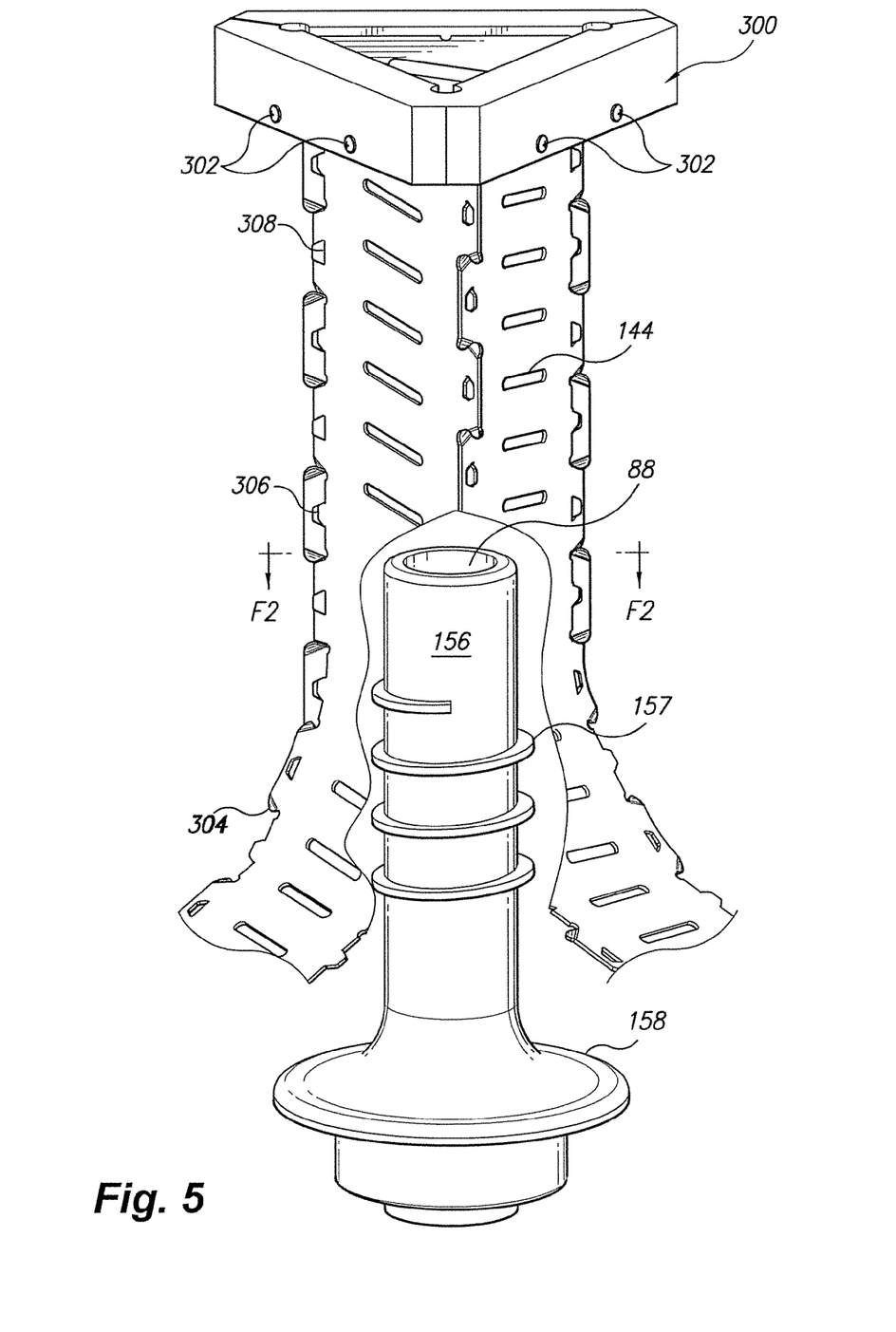
FIG. 5 is perspective view of a bottom portion of the retractable mast, according to an example of the present disclosure.

FIG. 5 illustrates wherein mast 300 is formed by bands 102, 104, and 106, drawn together and upwards by the rotation of engagement rotor 156, the helical thread 157 of rotor 156 engaging at least one angled slot 144 of each band. As described above, each tooth 304 of a band is locked between two teeth 304 of an adjacent band to form the primary lock. Each tab 106 disposed between two teeth 304 on a band engages a slot 308 disposed within tooth 304 of the adjacent band to form a secondary lock.

Once the primary and secondary interlocks are engaged, the outward force created by the camber 108, 110, and 112, as depicted in FIG. 2, operates to maintain the rigidity of the mast 300.

FIG. 5 further depicts wherein a bottom portion of rotor 156 has a curved flange portion 158 that makes contact with the bands, guiding the bands 102, 104, and 106 towards the threads 157 as the mast is extended, and facilitating separating the bands as the mast 100 is retracted.

FIG. 5 further depicts an anti-sway device 300 disposed at the upper end of the mast 100 below platform 194 to apply tension on the interlocked bands via a pair of set screws 302 that apply pressure against each band. Thus, based on the primary and secondary interlocking mechanisms and the anti-sway device 300, the mast 100 is sufficiently rigid for use in environments experiencing external forces such as vibration and wind.

Bands 102, 104, and 106 are designed to self-wind into spools 82, 84, and 86 (see FIG. 1) when the mast 300 is lowered. In one embodiment, the bands 102, 104, and 106 are laser cut from 0.015-0.032 inch thick Type 301, full hard, high yield stainless steel, which provides extra high strength and is able to resist the external forces that may operate to twist the mast, or cause the bands 302*a-c* to disengage. The bands are cut so that the direction of the steel bands runs along a lengthwise axis corresponding to a direction when unrolled from a roll of steel used to supply the band material. When cut from steel stock, taking into account the curvature of the supply roll, unrolling and rolling the band on the mast's spool assembly during operation of the mast is facilitated.

Each band 102, 104, and 106 is rolled to form a spool of a predetermined inside and outside diameter. The diameters are predetermined based upon the desired height of the mast and the condition that when coiled, teeth 304 are in radial alignment so as to lie flat against an underlying tooth of smaller length. The inner and outer diameters of the wound band 302 are maintained while the wound band 302 is heated for approximately 2-4 hours in an oven preheated to about 650-800 degrees Fahrenheit (preferably 3 hours in an oven preheated to about 700 degrees Fahrenheit), after which time the band 302 is removed and is cooled, e.g., air cooled in at least some embodiments.

In at least one embodiment, each band may be composed of 0.025 inch thick Type 301, full hard, high yield stainless steel. In other embodiments, the flexible bands may be made of a synthetic material, such as plastic, a flexible ceramic, or a composite material.

Although the exemplary embodiments illustrated and discussed herein may comprise three bands, other embodiments may employ more bands based upon user specific operational requirements.

Coaxial bore 88 is formed within the engagement rotor 156 and may permit at least one signal cable 98 to extend from cable pan 166 (see FIG. 6A and FIG. 6B) mounted within base 78 of the apparatus 10, through a passageway formed by bands 102, 104, and 106 through the length of the mast 100. The at least one signal cable 98 may interconnect at least one device, i.e., camera/sensor 168, mounted on top of platform 194 at the top of the mast 100 to components though a connector 167 disposed in an edge of cable pan 166.

Figure 6A:
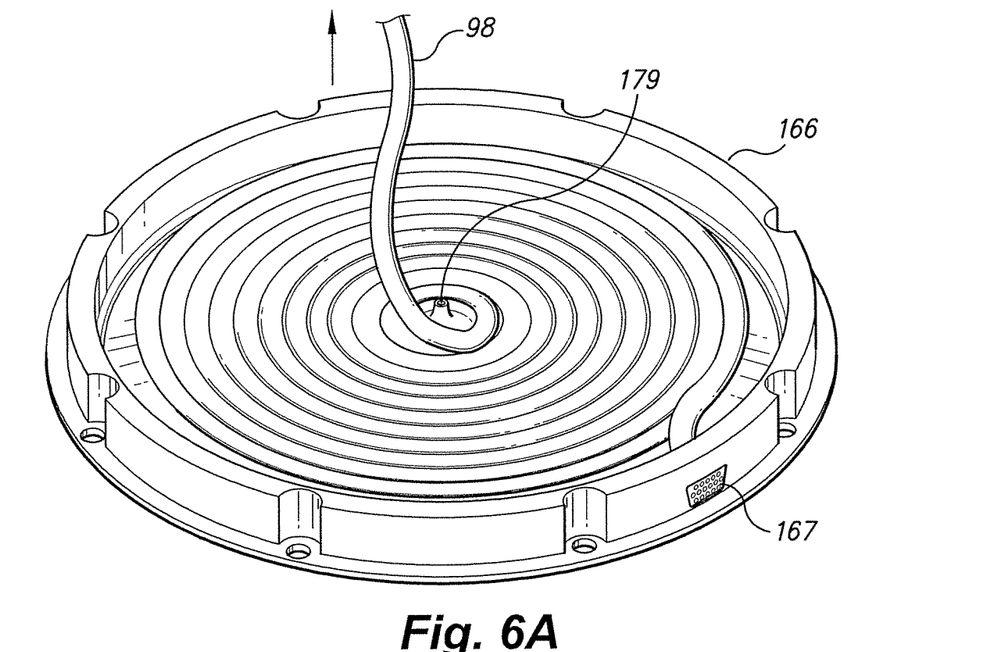
FIG. 6A is a perspective drawing of a cable being drawn from a cable pan during the extending of a retractable mast, according to an example of the present disclosure.

FIG. 6A depicts a cable 98 being drawn from cable pan 166 located at the bottom of base unit 78 as the mast 100 is extended. In one embodiment, cable 98 transmits power and communication signals from the base of the mast 100 to the one or more devices at the top of the mast 100 through the center of the mast 100. The cable 98 is coiled on the bottom the cable pan 166, one end of cable 98 being fixed to a stationary portion of cable pan 166. The stationary portion may include a cable connector 167 that may be further connected to control module 162, power module 172 and/or other devices supplying signals to or receiving signals from the mast mounted devices 168. As the mast is extended, cable 98 is drawn from the cable pan 166. The cable pan 166 includes a cable diverter 179 comprising a raised center point disposed in the center of a bottom of the cable pan 166.

Figure 6B:
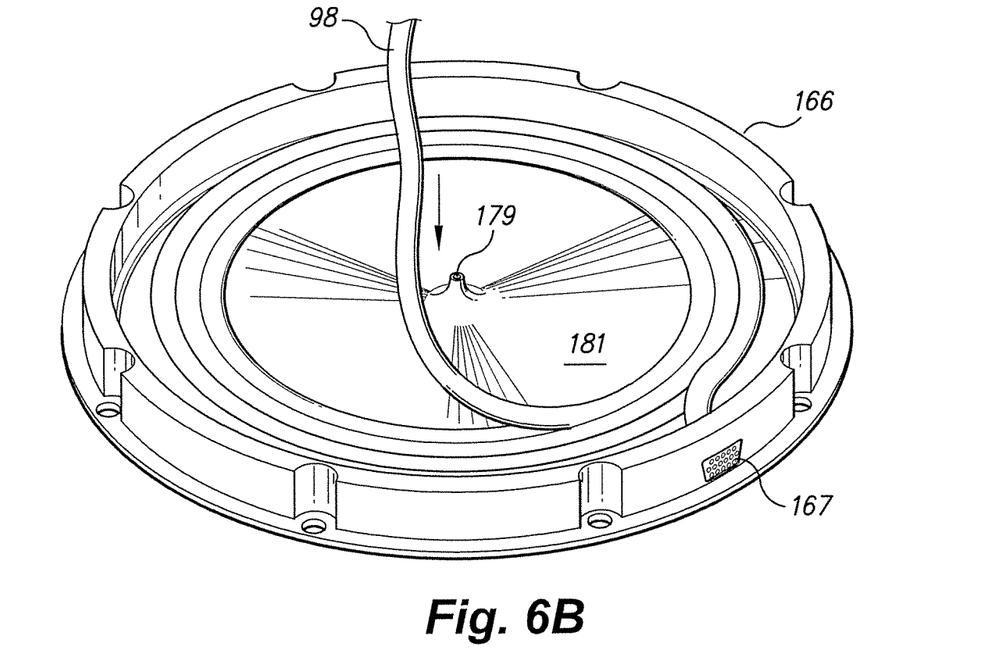

FIG. 6B depicts a cable 98 being coiled in a cable pan during retraction of mast 100. When the mast 100 is retracted, cable 98 is lowered into the cable pan 166 and is guided by diverter 179 outwards from the center of the cable pan 166. To facilitate extending a compact spiral of cable 98 within the cable pan 166, surface 181 of cable pan 166 is inclined downward and away from the diverter 179 to allow the cable 98 to slide along the inclined surface 181 and form a spiral of coil cable 98.

Figure 7:
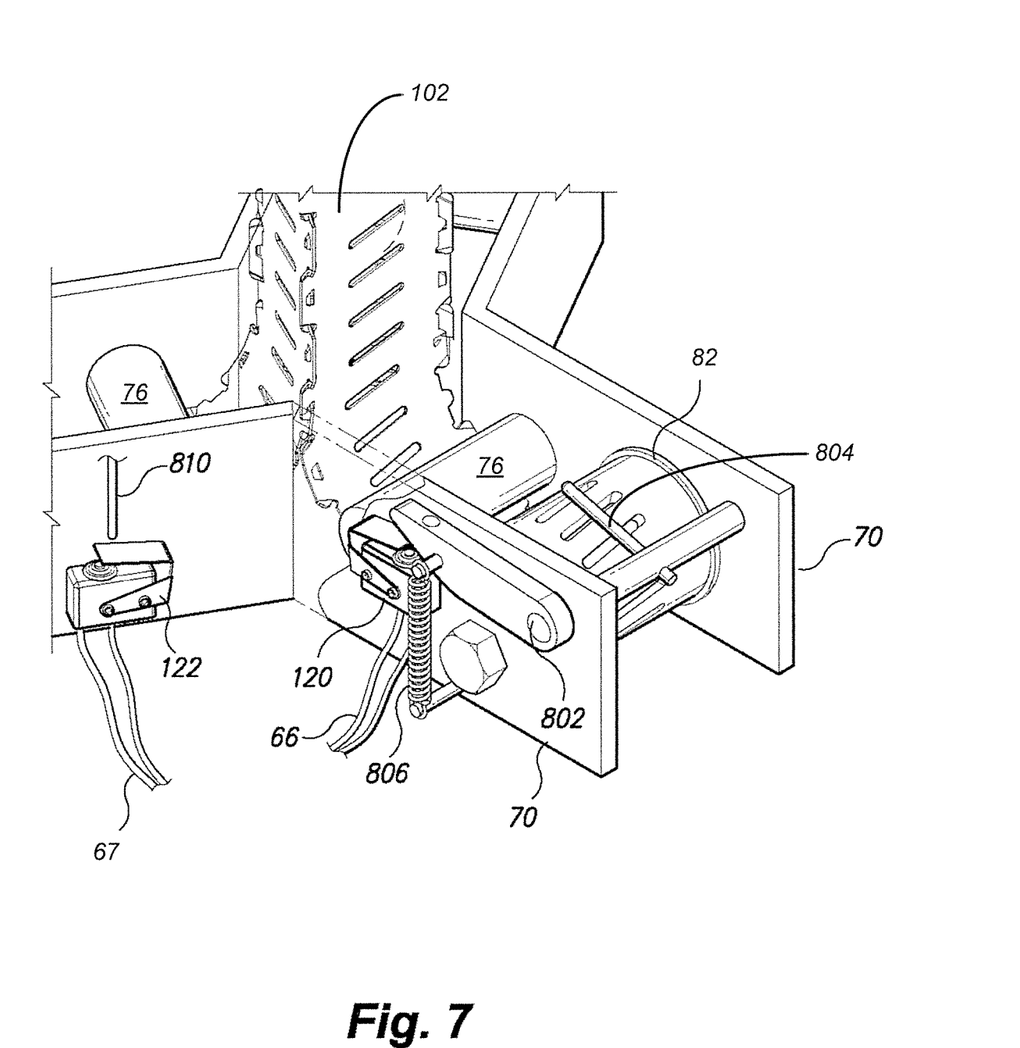
FIG. 7 is a perspective drawing of another example of the present disclosure.

FIG. 7 depicts a mechanism that allows for automatically stopping the extending or retracting of the mast. FIG. 7 depicts upper limit switch 120 and lower limit switch 122 that provide signals when the mast 100 is fully extended, and fully retracted, respectively. Upper limit switch 120 is activated by a rotating member 802 that is rotated by operation of a contact rod 804 that is biased by a spring 806 to maintain contact rod 804 in contact with the outer layer of spooled band 102. As the mast 100 is formed, band 102 is drawn from the spool, reducing the diameter of spooled band 102, causing the contact rod 804 to rotate downward. Rotating member 802 follows the rotation of contact rod 804. When an amount of spooled band 102 is reduced to a predetermined diameter such that the mast 100 is fully extended, rotating member 802 actuates the upper limit switch 120 and provides a signal over leads 66 to a control module 162 (see FIG. 9).

In one embodiment, lower limit switch 122 is activated by a rod 810 extending downward from a base plate, not shown, that is depressed by platform 194 as it is lowered. Upon activation, lower limit switch 120 provides a signal 67 indicating that the mast is in a fully retracted state.

Figure 8:
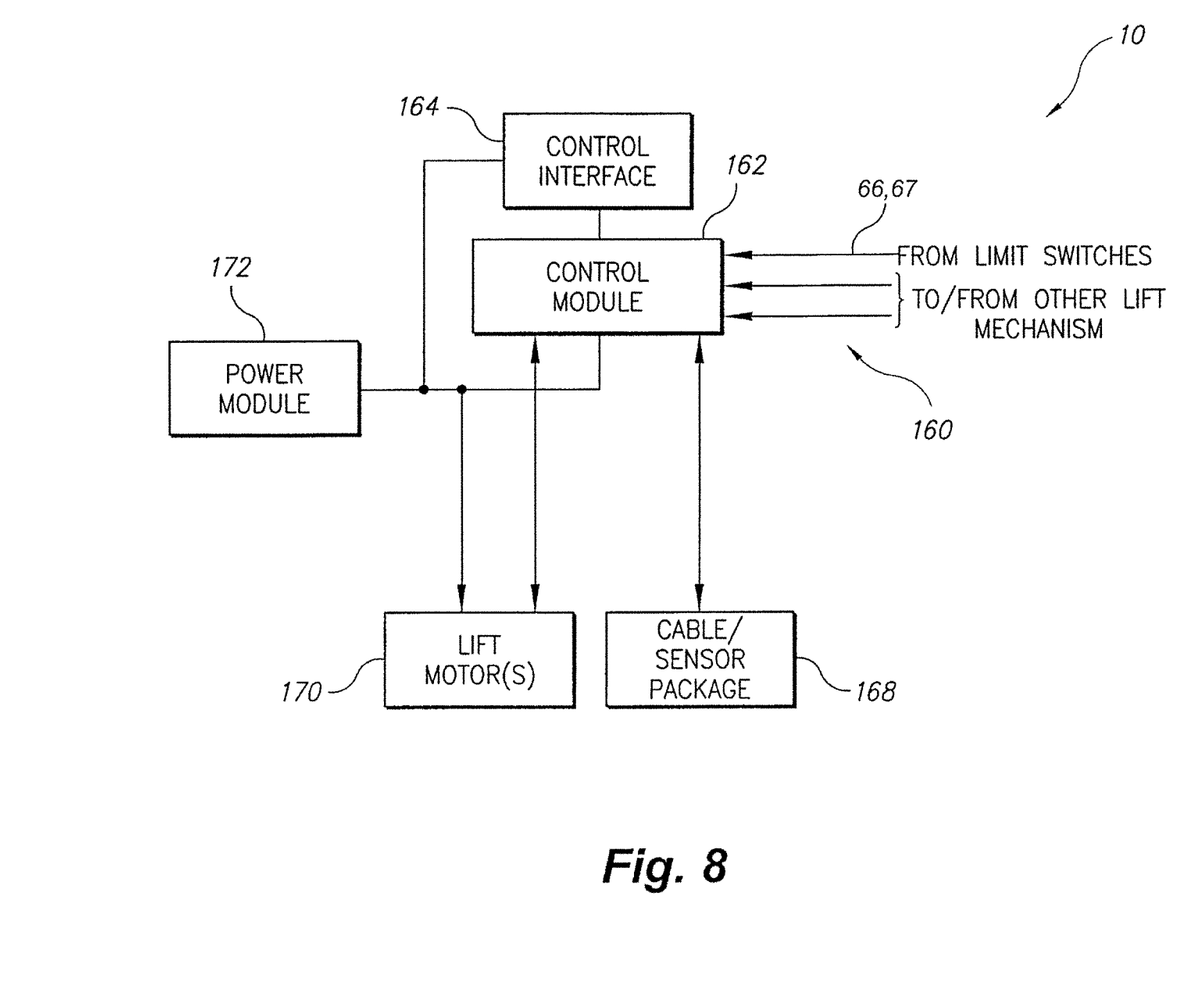
FIG. 8 is a block diagram of the lift mechanism, according to an example of the present disclosure.

FIG. 8 is a block diagram illustrating the control logic for the lift mechanism 10 of FIG. 1. Control interface 164 provides a user with an interface to extend and retract the mast 100.

Control interface 164 is operated by a user to extend and retract the mast 100 and communicates with a control module 162 via a wired or wireless data link.

Control module 162 may include an application-specific integrated circuit ("ASIC"), or other chipset, processor, logic circuit, or other data processing device. Control module 162 may also include memory, which may comprise volatile and nonvolatile memory such as read-only and/or random-access memory (RAM and ROM), EPROM, EEPROM, flash, or any memory common to computer devices.

Control module 162 may further comprise logic that calculates the height of the mast 100 based upon a predetermined formula based upon a run time of the motor 170. An indication of the mast height provided to the user may allow the user to extend the mast 100 to a user determined length/height, or may allow the control module 162 to extend the mast 100 to a predetermined height by controlling the activation time of the motor 170. Furthermore, the control module 162 may comprise inputs and outputs 160 that may be connected to other lift mechanisms 10 so as to permit multiple lift mechanism 10 to operate in a master/slave relationship. For example, synchronizing the extending and retracting of a plurality of masts 100 to the same or to different heights based upon predetermined or user selectable inputs may be useful in situations requiring addition support, for example, to form a horizontal surface large enough to support the landing or take-off of an Unmanned Aerial Vehicle (UAV).

Further still, control module 162 automatically stop extending mast 100 in response to a determination that the mast is fully extended based upon a signal received from high level limit switch 120. Similarly, control module 162 may automatically stop lowering the mast 100 in response to a determination that the mast 100 is fully retracted based upon a signal received from low level limit switch 122.

Power module 172 may comprise any source of power suitable for use by the lift mechanism 10 and may include AC or DC inputs as well as AC and DC output capability. Non-limiting, the power module 172 may include a power cable to a source of AC power as well as NiMH and Li-ion rechargeable batteries. The power module 172 is operable to deliver required power to the control interface 164, control module 162, the lift motor(s) 170, the devices on top of the mast 100, as well as any other devices requiring electric power.

In one embodiment, the controller module 162 and the power module 172 are mounted in a sealed center section of the base unit 78 above cable pan 166.

Figure 9:
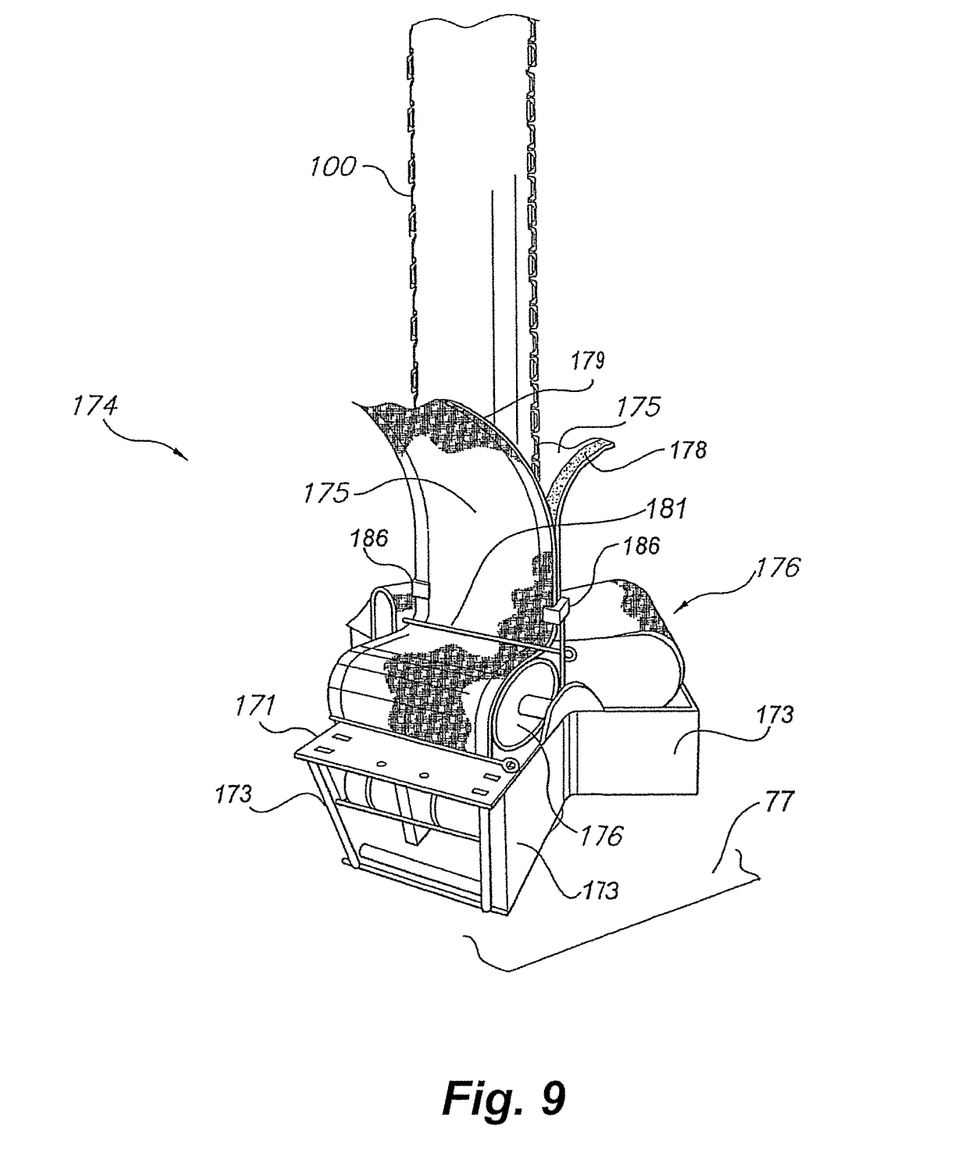
FIG. 9 is a perspective drawing of one embodiment of a retractable shield for the lift mechanism, according to an example of the present disclosure.

FIG. 9 illustrates one embodiment of an automatically deployable and retractable mast shield apparatus 174. In certain environments, the mast 100 may be subject to potentially destructive material which may threaten proper operation of the lift mechanism. For example, rain may pass through openings in the mast 100 and potentially enter the base of the lift mechanism. Furthermore, dust or dirt may clog the slots and freezing rain may lock up the mast 100. Accordingly, a mast shield apparatus 174 that operates to automatically surround the mast 100 as the mast is extended and automatically retracts when the mast is retracted may be beneficial. Furthermore, in some applications, e.g., trade shows, a mast shield apparatus having an esthetically pleasing covering is appropriate.

In some embodiments, mast shield apparatus 174 includes a housing 171 that is mounted over a lift mechanism (not shown). In one embodiment the housing 171 includes three pairs of upright support members 173 mounted on a partially shown support surface 77. Each pair of support members 173 is operable to support roller 176, which comprises a spool of shield material 175 to shield each band 102, 104, and 106. In some embodiments, the shield material 175 is made of canvas, a synthetic material, or any suitable material, each shield material having a width larger than a width of the flexible bands that comprise the mast 100. The shield material has a length to encompass the length of the mast 100. Furthermore, a top portion of each length of shield material 175 is securely fastened to the top of the mast 100 or may be fastened to platform 194.

As the mast is extended, the attached shield material 175 is drawn from rollers 176, causing the rollers 176 to rotate, applying tension to a spring (not shown) disposed within each roller 176. Non-limiting, tensioned rollers are known to those of ordinary skill in the art, and any suitable spooling mechanism may be incorporated.

In one embodiment, a retaining rail 181 is operable to align the shield material 175 in front of the mast 100, at which point a guide mechanism 186 may operates to force the edges 178, 179 of the shield 175 together as the shield material is 175 are drawn off their respective spools 176. Opposing edges 178, 179 of adjacent shields material sections may employ an attachment mechanism, e.g., Velcro, a plastic or metal zipper arrangement, or other known mechanism, to removably connect the sections of shield material 175 together as the mast is extended. As the mast is retracted, the tensioned rollers 176 winds up the shield material, causing the edges 178, 179 disengage after passing through the guide mechanism 186.

Figure 10:
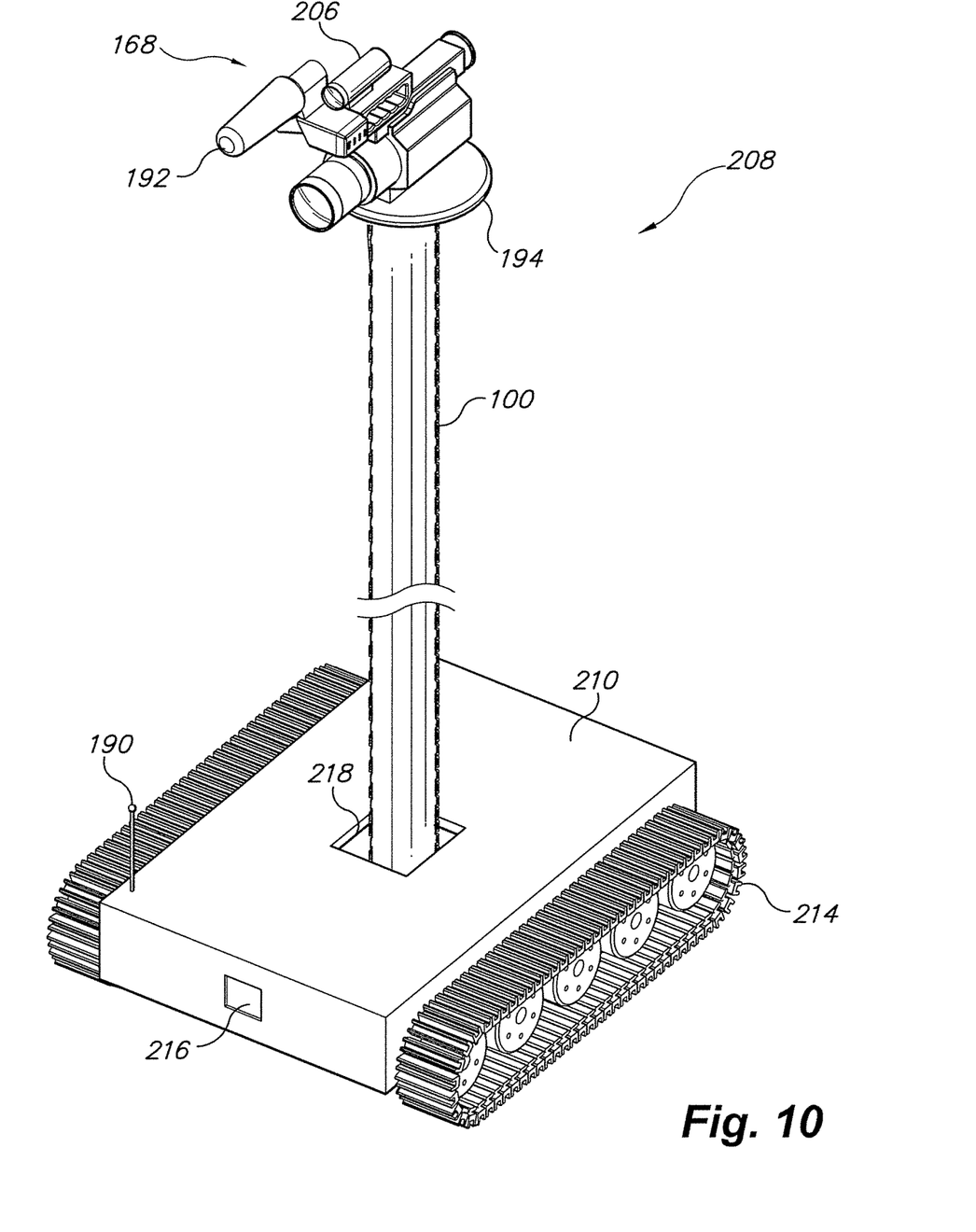
FIG. 10 is an embodiment of a robotic device incorporating the lift mechanism, according to an example of the present disclosure.

FIG. 10 illustrates a robotic lift apparatus 208 comprising the lift mechanism of FIG. 1 incorporated within a robotic device 210. Such a robotic lift apparatus 208 may be beneficial to military and law enforcement agencies in providing surveillance at different elevations.

Mounted in a housing 210 equipped with a transport system, e.g., treads 214, a mast 100 may be extended through an opening 218 in the housing 210, raising a camera 168 and/or other devices, e.g., lamp 206 and microphone 192, mounted on a platform 194. A housing mounted antenna 190 and controller within the housing allows the robotic device and lift apparatus 208 to be operated wirelessly from a remote device. A power module (not shown) mounted within the housing 210 may comprise rechargeable batteries that may be recharged using an external mounted terminal 216. Although treads 214 may be incorporated in the robot lift apparatus 208, robots and robot drive units are known. Accordingly, the transport system may comprise wheels or any other available mechanism.

While the foregoing disclosure shows illustrative embodiments, it should be noted that various changes and modifications could be made herein without departing from the scope of the described embodiments as defined by the appended claims. For example, the apparatus 10 may modified to extend a retractable mast in a downward or other direction based upon a specific application.

Furthermore, although elements of the described embodiments may be described or claimed in the singular, the plural is contemplated unless limitation to the singular is explicitly stated.

What is claimed is:

1. A method for extending a retractable mast having at least three flexible bands, each band of the at least three flexible bands including a left edge portion, a right edge portion, and a body therebetween, wherein each of the right edge portion and the left edge portion of the band has a series of alternating teeth and tabs disposed thereon, each tooth having a slot disposed therein, the method comprising:
    extending the retractable mast by drawing together each band from a respective spool of the flexible band, and engaging the left edge portion of each of the bands with the right edge portion of an adjacent band,
    wherein engaging the bands includes interlocking the teeth disposed on the left edge portion of each band with the teeth disposed on the right edge portion of an adjacent band, each tooth comprising a crown portion having an upper bent portion and a lower bent portion, wherein interlocking the teeth includes interlocking the upper bent portion within a notch cut at a lower base portion of an upper opposing tooth, and interlocking the lower bent portion within a notch cut at an upper base portion of a lower opposing tooth, the upper and lower bent portions angled in a same direction so as to extend over the adjacent band, and
    wherein engaging the bands further includes a slot, disposed in each tooth, receiving a tab disposed between adjacent teeth on an adjacent band.

2. The method of claim 1, wherein at least one band of the at least three bands comprises a row of angled slots disposed along a length of the at least one band, and extending the retractable mast comprises rotating, in a forward direction, an engagement rotor having a helical thread to engage the row of angled slots.

3. The method of claim 2, further comprising rotating the engagement rotor in a reverse direction to lower the mast, the engagement rotor separating the bands by guiding the bands along a curved flange disposed at a bottom of the engagement rotor.

4. The method of claim 1, further comprising applying tension to the interlocked bands at a top of the mast.

5. The method of claim 1, further comprising drawing a cable through a coaxial bore disposed within the engagement rotor, the cable being drawn from a cable pan beneath the engagement rotor, the cable pan comprising a surface angled downwards and away from a raised center point of the cable pan beneath the engagement rotor.

6. The method of claim 1, further comprising extending and retracting a plurality of masts in a synchronized motion.

7. The method of claim 1, further comprising automatically stopping the extending of the mast in response to determining that an amount of remaining spooled flexible band has reached a predetermined amount.

8. The method of claim 7, wherein automatically stopping the extending of the mast comprises determining a diameter of the spooled band and activating a limit switch by a rotating member linked to a rotating control arm in contact with an outer surface of the spooled band.

9. The method of claim 1, further comprising extending a retractable shield around the retractable mast.

10. An apparatus for extending a retractable mast formed of at least three interlocked flexible bands, the apparatus comprising:
    a support structure;
    at least three flexible bands stored on respective spools within the support structure; and
    a feed mechanism mounted to the support structure to extend and retract the retractable mast, wherein each flexible band includes:

two rows of spaced apart teeth disposed along opposite edges of a flat middle body portion, each tooth comprising a crown portion having an upper projecting portion and a lower projecting portion to engage a row of spaced apart teeth on an adjacent band, both the upper projecting portion and the lower projecting portions on both edges of the band being bent towards an adjacent band, each tooth having a slot disposed therein to receive a tab disposed between the teeth of an adjacent band.

11. The apparatus of claim 10, wherein a notch is disposed at a lower base portion and an upper base portion of each tooth to engage the bent projecting portions of teeth on an adjacent band.

12. The apparatus of claim 10, wherein the feed mechanism comprises an engagement rotor having a helical thread to engage a row of angled slots disposed along a length of at least one band of the at least three bands.

13. The apparatus of claim 12, wherein the engagement rotor further comprises a coaxial bore to allow a cable to extend from a top of the mast, through the coaxial bore, to a cable pan beneath the engagement rotor, the cable pan comprising a surface angled downwards and away from a raised center point of the cable pan.

14. The apparatus of claim 12, wherein the engagement rotor comprises a curved flange disposed at a bottom of the engagement rotor to guide and separate the bands when lowering the mast.

15. The apparatus of claim 10, further comprising a mechanism to automatically stop the extending of the mast in response to a determination of a remaining amount of one spooled flexible band.

16. The apparatus of claim 10, wherein the mechanism to automatically stop the extending of the mast comprises a control arm to rotate in response to a changing amount of spooled flexible band, and a rotating member to rotate in unison with the control arm and actuate a limit switch in response to the control arm reaching a predetermined diameter of the spooled flexible band.

17. The apparatus of claim 10, further comprising an anti-sway device to apply tension to the interlocked flexible bands at a top of the mast.

18. The apparatus of claim 10 further comprising a mast shield mechanism to draw together lengths of shield material and form an enclosed covering around the retractable mast as the mast is extended and retract the lengths of shield material as the mast is retracted.

19. The apparatus of claim 10, further comprising a housing upon which the support structure is mounted, the housing including a transport system to provide a mobile vehicle from which the retractable mast may be extended.

* * * * *